(12) United States Patent
Moonen (10) Patent No.: US 8,305,891 B2
(45) Date of Patent: Nov. 6, 2012

(54) AUTOMATIC PACKET TAGGING

(75) Inventor: Jan Renier Moonen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 134 days.

(21) Appl. No.: 12/440,600

(22) PCT Filed: Sep. 10, 2007

(86) PCT No.: PCT/IB2007/053633
§ 371 (c)(1),
(2), (4) Date: Mar. 10, 2009

(87) PCT Pub. No.: WO2008/032256
PCT Pub. Date: Mar. 20, 2008

(65) Prior Publication Data
US 2009/0279545 A1    Nov. 12, 2009

(30) Foreign Application Priority Data
Sep. 15, 2006 (EP) ................................ 06120770

(51) Int. Cl.
*G01R 31/08* (2006.01)
*H04J 1/16* (2006.01)
*H04J 3/16* (2006.01)
*H04L 12/26* (2006.01)
*H04L 12/56* (2006.01)
*H04M 3/42* (2006.01)
*G06F 15/177* (2006.01)

(52) U.S. Cl. .............. 370/230; 370/395.21; 370/401; 370/466; 379/201.12; 709/220

(58) Field of Classification Search ......... 370/229–231, 370/338, 391–392, 395.21, 411–429, 401, 370/466; 379/201.12; 709/220
See application file for complete search history.

(56) References Cited

U.S. PATENT DOCUMENTS

| | | | | |
|---|---|---|---|---|
| 6,415,313 B1 * | 7/2002 | Yamada et al. | ............... | 709/200 |
| 6,823,393 B1 * | 11/2004 | Hericourt | ...................... | 709/230 |
| 6,859,438 B2 | 2/2005 | Haddock | | |
| 7,292,577 B1 * | 11/2007 | Ginipalli et al. | ........... | 370/395.1 |
| 2001/0037406 A1 * | 11/2001 | Philbrick et al. | ............... | 709/250 |
| 2001/0052017 A1 * | 12/2001 | Chen | ............................. | 709/226 |
| 2002/0031094 A1 * | 3/2002 | Nitta | ............................. | 370/252 |
| 2002/0165966 A1 | 11/2002 | Widegren | | |
| 2003/0033467 A1 * | 2/2003 | Yoshizawa et al. | ........... | 710/305 |

(Continued)

FOREIGN PATENT DOCUMENTS
JP      11341057     * 12/1999

*Primary Examiner* — Marsha D. Banks Harold
*Assistant Examiner* — Jeremy Costin (57) ABSTRACT

A network device is arranged for coupling to a first network segment (18) to a second network segment (17), and has a transfer unit (23) for transferring data packets between the first and second network segments. The device has a determining unit (24) for determining a service requirement for a received data packet for accommodating the service requirement in the second network segment. A source of the received data packet in the first network segment is detected. Based on priority criteria and content type criteria a type of service is tagged to the data packet in dependence of the source. The transfer unit is arranged for accommodating the type of service in the second network segment. Advantageously a bridge is formed for transferring data packets that are unaware of quality of service to a network segment that operates according to quality of service requirements.

15 Claims, 8 Drawing Sheets

U.S. PATENT DOCUMENTS

| | | |
|---|---|---|
| 2003/0172160 A9 * | 9/2003 | Widegren et al. ............. 709/226 |
| 2004/0039820 A1 * | 2/2004 | Colby et al. .................. 709/226 |
| 2005/0083960 A1 * | 4/2005 | Gutierrez et al. ............. 370/428 |
| 2005/0100022 A1 | 5/2005 | Ramprashad |
| 2005/0135243 A1 * | 6/2005 | Lee et al. ...................... 370/229 |
| 2005/0195855 A1 | 9/2005 | Buskirk |
| 2005/0232222 A1 * | 10/2005 | McConnell et al. .......... 370/349 |
| 2006/0013129 A1 | 1/2006 | Sterenson |
| 2006/0013230 A1 | 1/2006 | Bosloy |
| 2006/0136574 A1 * | 6/2006 | Anand .......................... 709/219 |
| 2006/0149845 A1 * | 7/2006 | Malin et al. ................... 709/228 |
| 2006/0168203 A1 * | 7/2006 | Levillain et al. .............. 709/224 |
| 2006/0268905 A1 * | 11/2006 | Su et al. ........................ 370/401 |
| 2008/0043697 A1 * | 2/2008 | Huomo et al. ................ 370/342 |

* cited by examiner

|  | IP-layer priority (DSCP) | Wired Eth priority (802.1q) | Wireless priority (WMM access category) |
|---|---|---|---|
| 0 (lowest) (software downloads, print jobs, etc) | 0x08 | 1 | BK |
| 1 (unknown) | 0x00 | 0 | BG |
| 2 (Audio or Video) | 0x28 | 5 | VI |
| 3 (Voice) | 0x38 | 7 | VO |

FIG. 8

AUTOMATIC PACKET TAGGING

FIELD OF THE INVENTION

The invention relates to a network device comprising a first interface unit for coupling to a first network segment, a second interface unit for coupling to a second network segment, transfer means for transferring data packets between the first and second network segments, and determining means for determining a service requirement for a received data packet that is to be transferred from the first network to the second network segment, for accommodating the service requirement in the second network segment.

The invention further relates to a method of determining a service requirement while transferring data packets between a first network segment and a second network segment, the method comprising the steps of determining a service requirement for a received data packet that is to be transferred from the first network to the second network segment, for accommodating the service requirement in the second network segment.

The invention relates to the field of network communication in a segmented network. The network may include a wireless part and a wired part. A network device, for example a switch, router, gateway, or an access point in a wireless network segment, constitutes a bridge between the segments. An access point communicates with wireless devices, and transfers messages between the wired and wireless segments.

BACKGROUND OF THE INVENTION

The document US 2006/0013129 describes resource utilization in networks. A network device, called an overlapping scheduler, receives data packets from various applications. The data packets are to be transmitted to the network. Some applications provide Quality of Service (QoS) parameters for transmission via the network, whereas others (especially the older ones) are not able to provide such parameters. For services where the QoS parameters are not available, the scheduler may determine QoS parameters, for example based on bandwidth measurements. Additional QoS parameters may be determined from analyzing the contents of arriving packets.

SUMMARY OF THE INVENTION

The document US 2006/0013129 provides an example of a method that receives data packets from applications and transmits the data packets to a network segment. Some data packets have known QoS parameters, whereas others have no such parameters. Where no QoS parameters are provided, the method determines the QoS parameters based on the contents of the data packets. On the output the network performance is improved by transmitting the data packets according to the QoS parameters. However, a problem of the known method occurs when a large number of packets arrive from a further network segment, for example from the internet. There is a need for transferring packets from a network segment where QoS parameters are usually absent to a segments where service parameters can be controlled and used to improve the performance. However, detecting QoS parameters directly from the contents of the packets, or performing bandwidth measurements for that purpose, is not viable.

It is an object of the invention to provide a network solution to bridge a gap between a first and second segment of a network, where service parameters in the first segment are not controlled, whereas in the second segment data packets may be accommodated based on service parameters.

For this purpose, according to a first aspect of the invention, in the network device as described in the opening paragraph, the determining means are arranged for determining the service requirement by detecting a source of the received data packet in the first network segment, and assigning, to the received data packet, a type of service in dependence of the source, and the transfer means are arranged for accommodating the type of service in the second network segment for the received data packet.

For this purpose, according to a second aspect of the invention, in the method as described in the opening paragraph, the step of determining comprises detecting a source of the received data packet in the first network segment, and assigning, to the received data packet, a type of service in dependence of the source, and the transferring comprises accommodating the type of service in the second network segment for the received data packet.

The measures have the effect that data packets arriving from the first network segment, which segment is not aware of type of service or quality of service requirements, are automatically assigned the type of service, i.e. a respective priority is applied in the second network segment suitably selected for the respective data packet. The assignment is based on detecting the source of the data packet in the first network segment. Advantageously the device constitutes a bridge between two network segments, the first segment being unaware of type of service and the second operating according to the type of service for improved performance and effective use of the network resources.

The invention is also based on the following recognition. It has been noted that other systems exist that translate quality of service (QoS) criteria from one networking protocol to another protocol. For example U.S. Pat. No. 6,859,438 describes a policy-based mechanism for monitoring and prioritizing traffic within a network and allocating bandwidth to achieve true quality of service. The device receives QoS policy information, e.g. information indicative of a set of traffic groups and related QoS settings, an IEEE 802.1p priority indicator or an IEEE 802.1q frame tag, or information about the QoS based on the topology of the network. Based on the QoS information received as input parameters data packets are scheduled for output according to QoS policy for an identified traffic group to which the packet is associated. The inventors have seen that, whereas such devices translate input QoS information received according to one protocol for use in a further network segment, the known devices do not provide a solution when no QoS information is available. The current invention provides a true bridge for coupling QoS unaware traffic to a QoS aware network segment. When no QoS information is available, the source of the data packets is detected, and used to set a type of service for use in the second network segment, e.g. by a mapping of the detected source to a content type.

In an embodiment of the network device the determining means are arranged for detecting the source of the received data packet based on at least one of a network address indicator; a network port indicator; a media access indicator; and, in the event of the first network segment being part of the Internet, an Internet Protocol (IP) address; a Uniform Resource Locator (URL). This has the advantage that the source can be easily detected during the setup of a link via the device, and/or from control data associated to the data packets, like packet headers.

In an embodiment of the network device the determining means are arranged for said assigning the type of service by applying predefined criteria, the criteria including at least one of a mapping of a content type to a source, and priority criteria for a source. This has the advantage that such criteria can be easily provided by a user who does not need to be an expert in the field of data communication, or by setting such criteria by an external source.

In an embodiment of the network device the transfer means are arranged for accommodating the type of service by adapting a control portion of the received data packet according to a predefined protocol. The control portion is set according to the protocol requirements in the second network segment. This has the advantage that in the second network segment a standard QoS mechanism can be accommodated. In particular said adapting may comprise adapting a header by setting a type of service field. Advantageously the data packet will subsequently be send via the second network segment according to the adapted header.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

In the Figures, elements which correspond to elements already described have the same reference numerals.

DETAILED DESCRIPTION OF EMBODIMENTS

Figure 1:
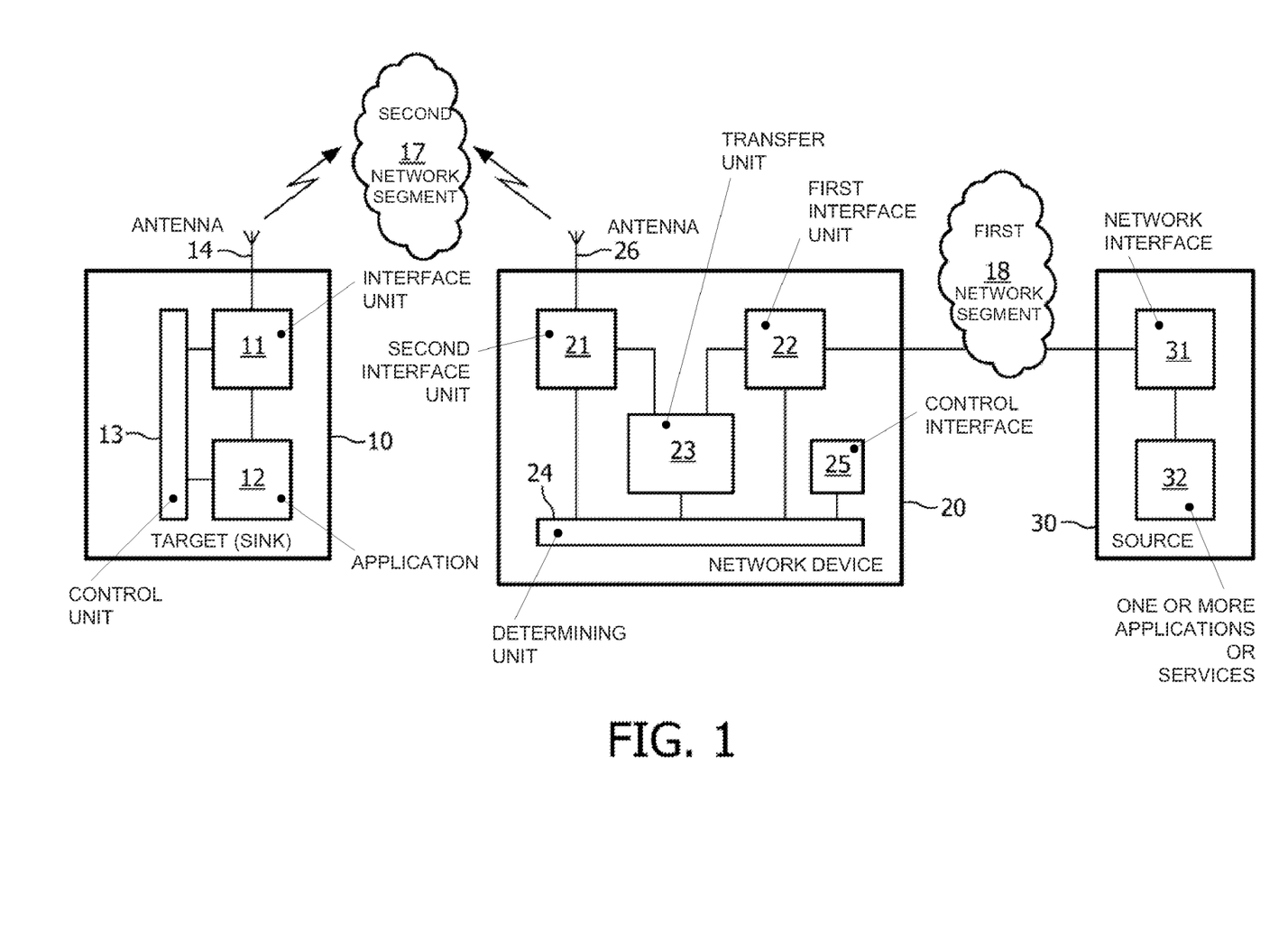
FIG. 1 shows a network device in a network.

FIG. 1 shows a network device in a network. The network has a first network segment 18, for example a wide area network (WAN) like the Internet, which is coupled to at least one source 30, and a second network segment 17, for example a local area network (LAN), coupled to at least one target, whereas the network device 20 is coupled to both network segments. Data packets may be exchanged between the source and target via the network. The source, for example a server providing a website to the internet, has a network interface 31, and one or more applications or services 32 that are able to communicate to the target by exchanging data packets via the network. The target 10, for example a home computer accessing the internet, has at least one application 12 and a control unit 13, and an interface unit 11 coupled to an antenna 14 for accessing a wireless network segment.

Priority-based Quality of Service (QoS) data communication is starting to be deployed in home networks through access points, gateways, bridges and network cards. To work effectively, QoS requires both the server/source of the stream and the networking infrastructure (wireless access points, gateways) to be 'QoS-aware'. In many cases, however, this is not the case, and the consumer is unable to 'upgrade' the non-QoS aware devices, for example, because the source device is actually a server on the Internet. A solution is provided by the network device, which constitutes a bridge from parts of the delivery chain that are not QoS-aware to a network segment that is QoS aware.

The network device 20 has a first interface unit 22 for coupling to the first network segment 18, a second interface unit 21 for coupling to the second network segment 17, a transfer unit 23 for transferring data packets between the first and second network segments, and a determining unit 24 for determining a service requirement for a received data packet that is to be transferred from the first network to the second network segment. The determining unit 24 may be coupled to a control interface 25, e.g. a user interface. The second interface unit 21 may have an antenna 26 for accessing a wireless network segment 17 as shown. The second interface unit 21 may alternatively be a further wired interface, e.g. coupled to a local area network (LAN). The determining unit 24 is coupled to the first and second interface units, and to the transfer unit 23, for accommodating the service requirement in the second network segment. Thereto the determining unit is arranged for determining the service requirement by detecting a source of the received data packet in the first network segment, and assigning, to the received data packet, a type of service in dependence of the source. Furthermore the transfer unit is arranged for accommodating, in the second network segment, the type of service as determined for the received data packet.

A stream of data packets, e.g. a video or audio stream, is to be transported from the source to the target (also called sink). Note that several streams may be accommodated in the network at the same time between various sources and one target, or vice versa. The streams pass via the network device 20, which constitutes a bridge between two network segments. The network device may for example be a wireless access point (WAP), a wireless bridge, a gateway, router or switch, or a media server.

The determining unit is arranged to determine a type of service requirement for network packets that do not have this type of service when arriving from the first network segment. Subsequently these packets are processed and forwarded to the second network segment as if the type of service was present. This improves the end-to-end communication between the source and sink of a stream, where packets often travel different network segments (e.g., from WAN to LAN).

The device will automatically inspect incoming packets, and determine whether packets fall into the priority categories used in the network by determining the source of the packets. To improve classification accuracy additional 'content type rules' can be defined which define the content type for all traffic coming from one or more specific sources. For unspecified sources, the device may revert back to the automatic analysis. For accommodating the service type in the second network segment, the device can assign Layer 2 and/or Layer 3 priority tags as explained below in detail.

Figure 2:
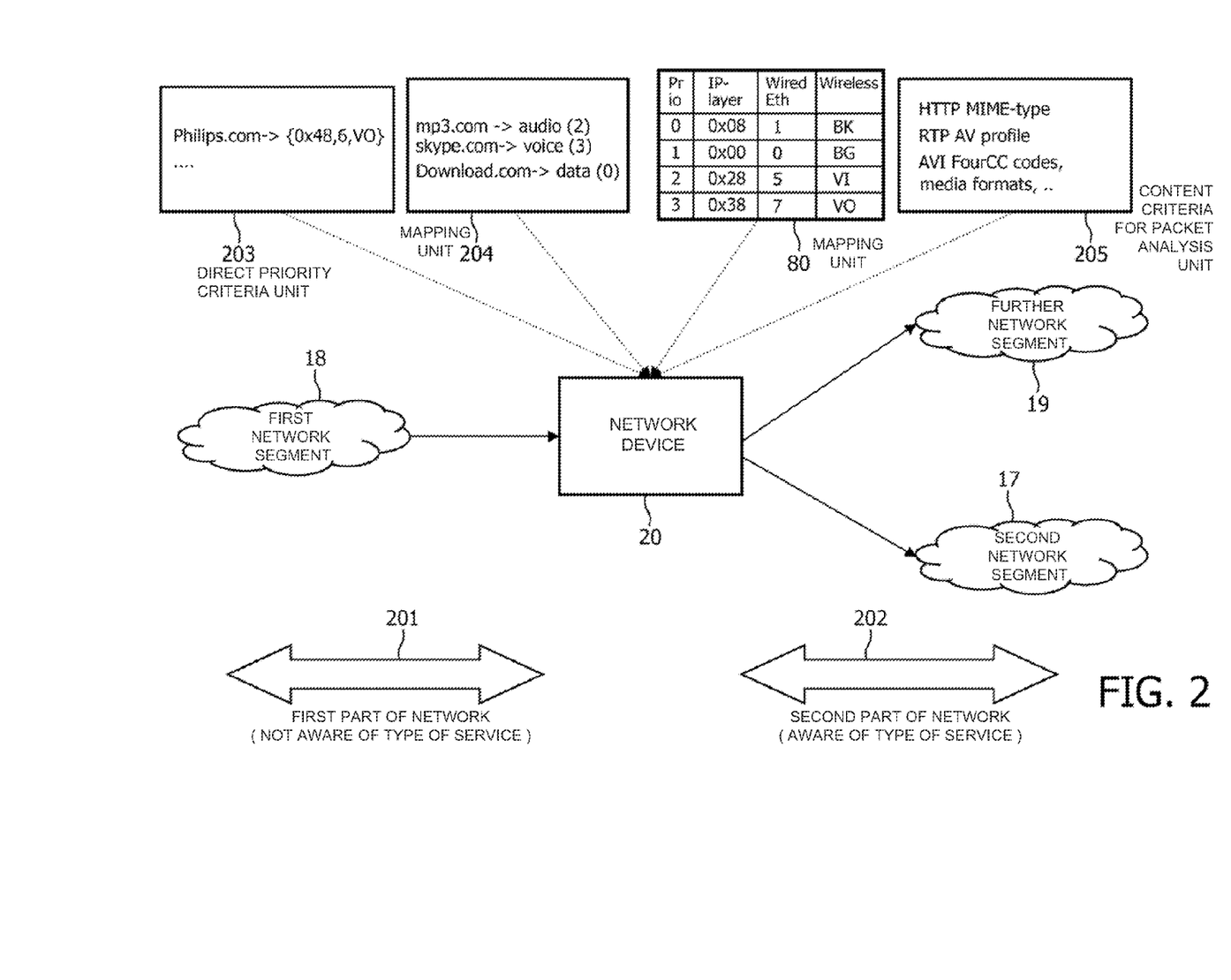
FIG. 2 shows a network device between network segments for determining the type of service.

FIG. 2 shows a network device between network segments for determining the type of service. The network device 20 has a first interface for receiving data packets without a type of service or QoS priority from a first network segment, e.g. the internet. The device 20 transfers the data packets to a second network segment 17, for example according to a WMM QoS priority to a home WiFi wireless network segment. The standard for Wifi (WMM) defines priorities for wireless packets in 4 categories, in increasing priority: BG (background), BE (best effort), VI (video), VO (voice) (see http://en.wikipedia.org/wiki/WMM). Arrow 201 indicates a first part of the network that is not aware of type of service or QoS requirements. Arrow 202 indicates a second part of the network that is aware of type of service or QoS requirements. The network device 20 constitutes a bridge between the two parts.

Alternatively, or additionally, the network device may be interfacing to a further network segment 19, e.g. a wired home Ethernet, which receives packets tagged by the device with QoS priority according to IEEE 802.1q.

Figure 8:
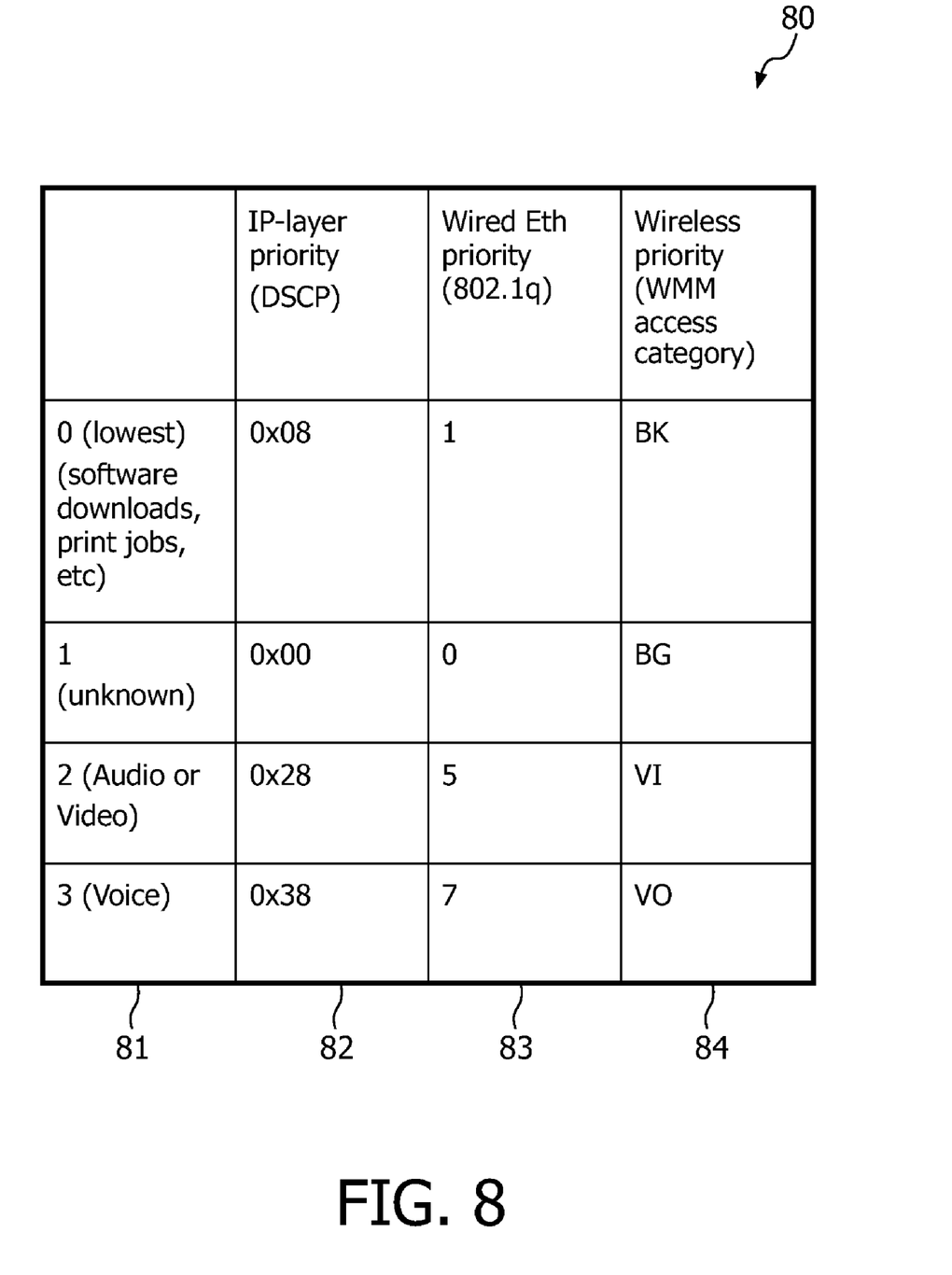
FIG. 8 shows a priority mapping.

The upper section of FIG. 2 indicates the mechanism for determining the type of service, representing the function of the determining unit 24 as shown in FIG. 1. The leftmost unit 203 shows direct priority criteria for particular sources, e.g. based on the user's preferences, for example assigning the priority VO (coded 0x48) to the URL philips.com. The next unit 204 has a mapping of sources (based on internet URL) to a type of service, so called content type rules. The mapping may be preset, may be entered or edited by the user, or may be provided via the internet as a service, e.g. via an (automatic) download. The next unit, displaying a table 80 further discussed with reference to FIG. 8, provides a mapping of content type to Priorities. The rightmost unit 205 provides content criteria for packet analysis. In particular a few protocols are listed, and the respective control fields to be detected for determining the type of service are indicated. After determining the appropriate protocol, respective analysis of the fields provides a content type as input for assigning the type of service to the data packet.

In an embodiment the classification of data packets of a specific source are supported by analyzing the packets. Thereto the determining unit is arranged for said assigning the type of service based on analyzing a control portion of the received data packet according to a predefined protocol. For example the header of the packet, although intended for a different protocol layer, may reveal the service type. For example the control portion of data packets may have a Multipurpose Internet Mail Extensions (MIME)-type according to a hypertext transfer protocol (HTTP) protocol, an audio video (AV) profile according to a real time protocol (RTP), or a code indicating an encoder used for encoding the content of the data packet. A profile or media format may be indicated in the packets, e.g. the AVI FourCC code. A FOURCC (literally, four character code) is a sequence of four bytes used to uniquely identify data formats. Originally used in the Amiga IFF file format, the idea was reused to identify data types in Apple's AIFF format and Microsoft's RIFF format, and later in QuickTime and DirectShow. One of the most well-known uses of FourCCs is to identify the video codec used in AVI files. Common identifiers include DIVX, XVID, and H264. For audio codecs, AVI and WAV files use a two-byte identifier, usually written in hexadecimal (such as 0055 for MP3).

Further examples of protocols (and references for further information) that can be used for adding criteria for analysis are:

RTSP: 'Real-Time Streaming Protocol'. Protocol used to stream Audio or Video over the Internet (see RFC2326);

SIP: 'Session Initiation Protocol'. Protocol used for Voice or Video telephony over the Internet (see http://www.cs.columbia.edu/sip/drafts.html);

H323: Standard defining Video conferencing over the Internet (see http://www.packetizer.com/voip/h323/);

SDP: Session Description Protocol. Format for describing setup parameter of internet stream. Mostly used as part of a RTSP session or SIP session (see RFC 2327);

MPV: MPEG Video. Abbreviation used in SDP to indicate that a video stream uses MPEG Video format.

Note that the Request For Comments (RFC) references are available on www.ietf.org.

In an embodiment of the network device the determining means have a control interface for setting the above criteria, e.g. entering, adapting or removing the mapping of sources and content types. For example the control interface may be a user interface or an application programming interface (API). Such interfaces for setting properties, options and criteria are well known as such. The control interface improves the classification accuracy by allowing a consumer or another computer program to define 'content type rules' that define the content type for all traffic coming from a (set of) specific sources (e.g. based on IP addresses, ports, URLs, or Media Access Protocol (MAC) addresses). Also the consumer or another computer program may be allowed to 'override' automatic content classification, by explicitly defining the priority for all traffic coming from a specific source using 'priority rules'.

Via the control interface configuration of rules could be entirely manual (user typing in all info) or based on an 'import bookmarks/favorites' mechanisms. For 'well-known' URLs (popular video stores etc) the device could automatically suggest a content category, e.g. download.com is always background (priority 0) and Itunes.com is always audio/AV (priority 2).

Figure 3:
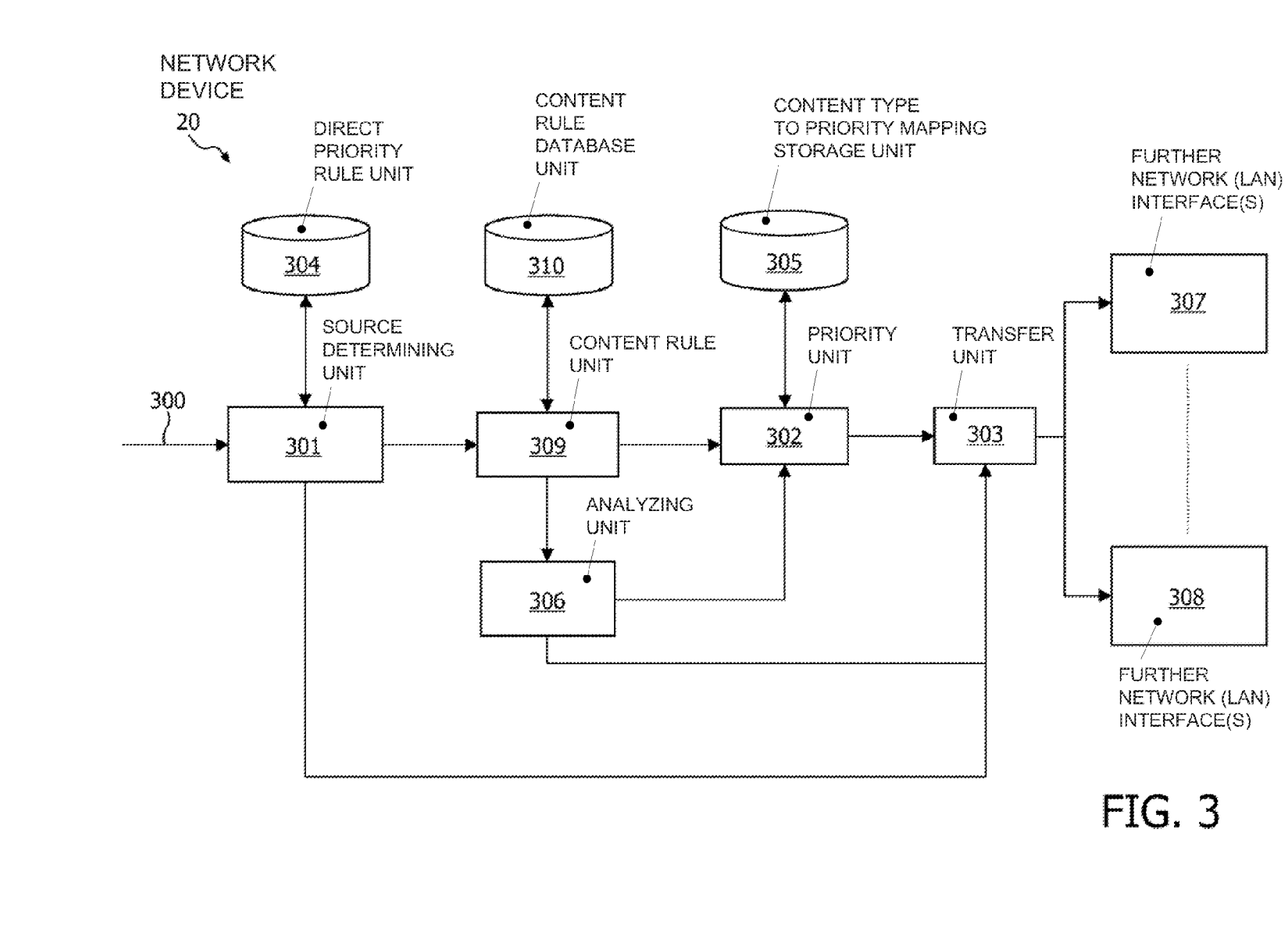
FIG. 3 shows a network device for assigning a type of service.

FIG. 3 shows a network device for assigning a type of service. The network device 20 has the following elements. On a first interface 300 data packets are exchanged with a network segment unaware of QoS. Incoming packets are received from a WAN. The packets are analyzed in a source determining unit 301, which identifies the source. The determining unit is coupled to a direct priority rule unit 304, e.g. a database, for matching the source against the direct priority rules. If a match is found the new priority is passed on to transfer unit 303. If no match is found, the data packet is further inspected in content rule unit 309, which is coupled to a content rule database unit 310. If a match is found the content type is passed on to a priority unit 302, which derives a priority based on a storage unit 305, which has a content type to priority mapping. The priority as derived, which may for example be set to a specific value for layer 2 (L2) and/or layer 3 (L3) protocols, is coupled to a transfer unit 303, which applies to priority for transferring the data packet to the further network segment via a further network interface, e.g. one of a range of further network LAN interfaces 307,308. The device may have an analyzing unit 306, which receives incoming packets for further inspection, in particular if no direct priority can be assigned in unit 301 and the content type cannot be determined based on the source, i.e. if no match is found by the content type by unit 309. The analyzing unit 306 inspects the packet header and content of the packet to determine the content type. If the content type can be detected, the content type is passed on to the priority unit 302. If the content type cannot be determined, the unit classifies the packet as "best effort", which is passed on to the transfer unit 303. It is noted that in practice the above units may be implemented as dedicated hardware circuits, and/or using shared hardware, e.g. a processor and memory, and suitable software. Furthermore, a more basic implementation may require, instead of separate matching units 301,302,309 and databases 304,305, 310, only single matching unit and database, e.g. applying a direct mapping of source against type of service and corresponding priority. The various rule databases may be configurable by users, or may require expert knowledge.

In an embodiment of the network device the source determining unit 301 is arranged for detecting the source of the received data packet as follows. The incoming data packets are analyzed to determine the source. The analyzing may take place when a specific link is established between a source (coupled to the first network interface) and a target (coupled to the second network interface), and/or when an individual packet arrives. In particular the source may be found based on at least one of a network address indicator, a network port indicator; a media access indicator, usually called MAC address. Moreover when data packets are received from the Internet, one of the following elements may be used: Internet Protocol (IP) address; a Uniform Resource Locator (URL).

In en embodiment the network device, the determining unit 301 may be arranged for said assigning the type of service by applying predefined criteria, the criteria including a mapping of a content type to a source. The mapping may include a table that maps a particular source (e.g. based on URL) to a particular content type (e.g. video, voice, audio). Alternatively the mapping may include a direct mapping of a source to a selected priority.

In an embodiment the transfer unit 303 is arranged for accommodating the type of service according to a priority as derived by adapting a control portion of the received data packet according to a predefined protocol. For example the header or other control fields of the packet may be adapted, usually in the L3 protocol. In particular said adapting may comprise adapting a header by setting a type of service field. Thereto a L3 tag may be inserted or given a specific value. In the IP protocol a suitable field to be set the Differentiated Services Code Point (DSCP) field which indicates the type of service. The DSCP (having 64 possible values) is a field in the header of IP packets for packet classification purposes that indicates the packet priority (similar to WMM). As the header is used at IP-level, it can be used for wired or wireless network segments.

In an embodiment of the device the network interfaces 307,308 have different buffer queues for packets of different type of service for interfacing to a wireless second network segment. The different buffer queues are selected based on a L2 priority for transferring the packets via a wireless network segment in a preferred order. The transfer unit 303 is arranged for accommodating the type of service according to the priority as derived by transferring the received packet via a selected one of the buffer queues based on the type of service.

In an embodiment of the network device the transfer means are coupled to a mass storage unit for storing data packets received from the first network segment and retrieving data packets to be transmitted to the second network segment, e.g. for constituting a media server. Incoming streams of QoS unaware data packets may be stored, and outgoing stream of QoS aware data packets may be retrieved and transmitted to users. In the embodiment, the determining means are arranged for said assigning the type of service before said storing or after said retrieving. Determining the type of service before storing requires that the detected type of service is stored also, and used while retrieving the respective stream of data packets. The respective data packets may be adapted after retrieving according to the stored or detected type of service.

Figure 4:
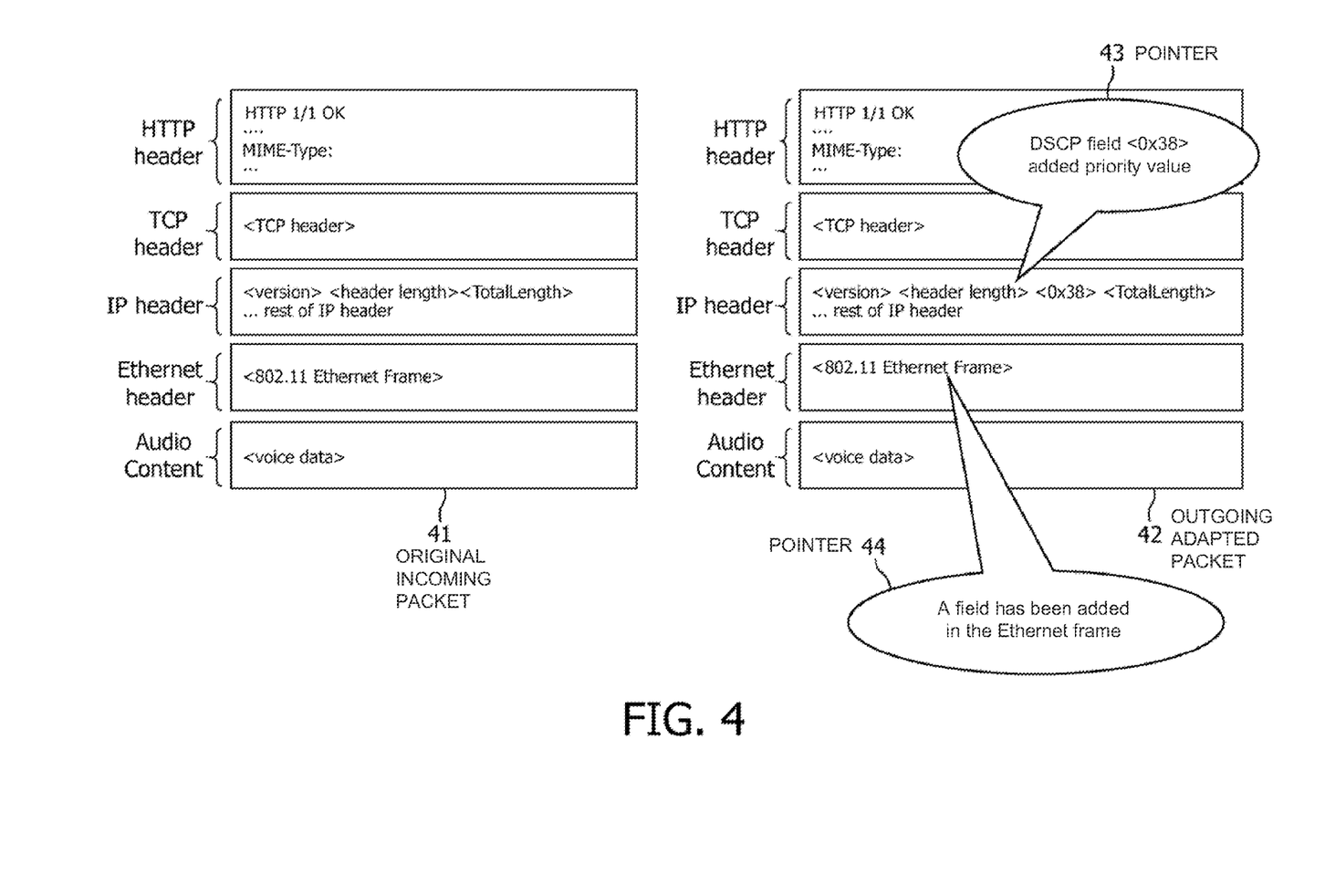
FIG. 4 shows packets before and after adaptation.

FIG. 4 shows packets before and after adaptation. In the left section of the Fig. the elements of the original incoming packet 41 are shown, in particular an HTTP header, a TCP header, an IP header, an Ethernet header, and the contents (voice data). In the right section of the Fig. the elements of the outgoing adapted packet 42 for output on Ethernet are shown, in particular an HTTP header, a TCP header, an IP header, an Ethernet header, and the contents (audio MP3 file data). As indicated schematically by a pointer 43 a field has been added, in the example being the DSCP field having the added priority value 0x38, to indicate Voice priority. Furthermore, as indicated schematically by a second pointer 44 a field has been added in the Ethernet Frame, for example an added 802.1q VLAN tag with a priority field set to 101 (=5 indicating video).

Figure 5:
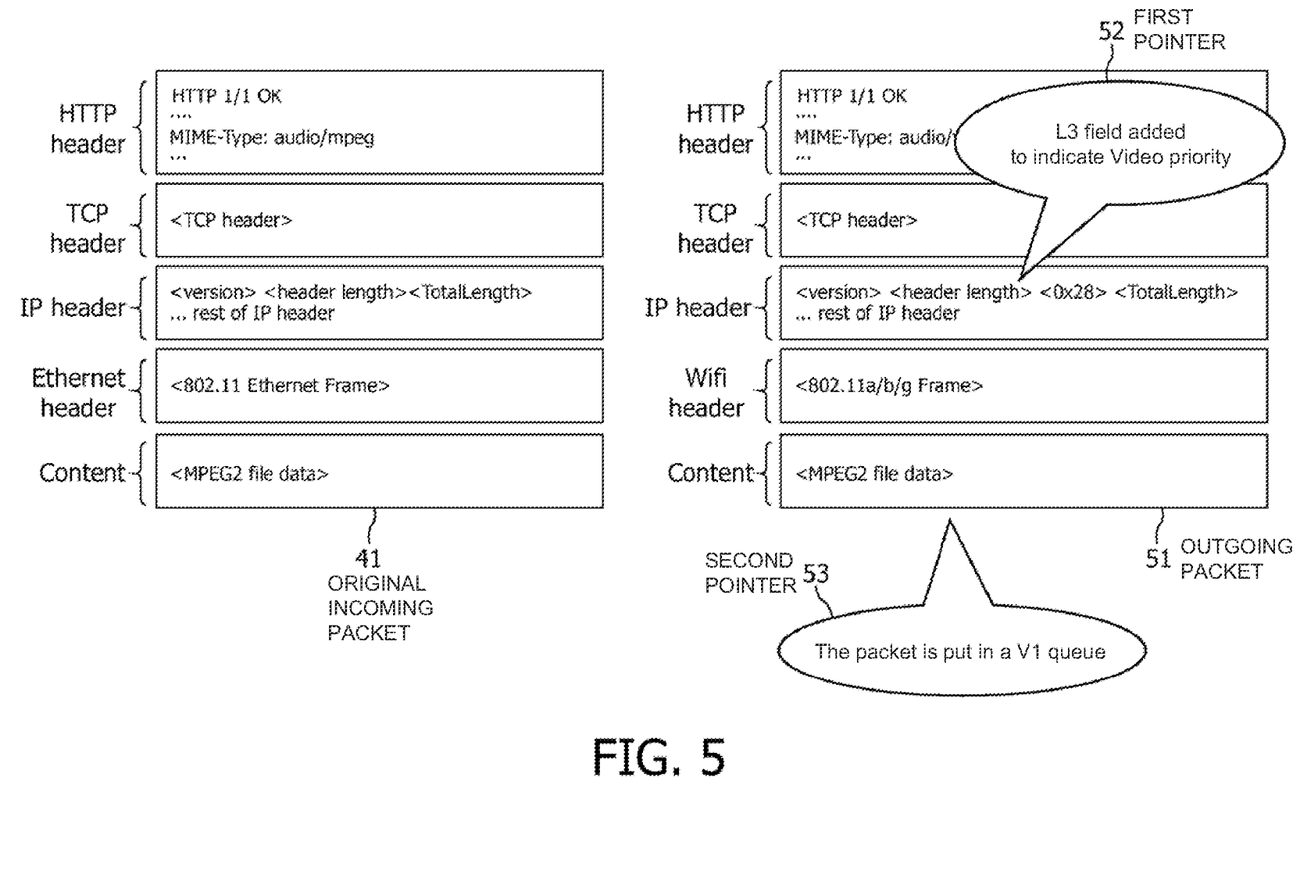
FIG. 5 shows an incoming packet and adaptation for WiFi.

FIG. 5 shows an incoming packet and adaptation for WiFi. Like in FIG. 4, in the left section of the Fig. the elements of the original incoming packet 41 are shown. In the right section of FIG. 5 the elements of the outgoing packet 51 for output on WiFi are shown, in particular an HTTP header, a TCP header, an IP header, an Ethernet header, and the contents (MPEG2 file data). As indicated schematically by a pointer 52 an L3 field may be added, in the example being the DSCP field having the added priority value 0x28, to indicate Video priority. Note that on L3 the same adaptation of the header is applied as discussed above, i.e. not dependent on the type of the network. Furthermore, as indicated schematically by a second pointer 53, on L2 according to WMM, the packet is put in a VI queue for video packets waiting for transmission on the wireless network segment. It is noted that accommodating the priority on L2 in a wireless network segment is not setting a value in a header field, but assigning so-called 'access category' corresponding to a different send buffer in a wireless transmitter or access point. Therefore, there is no need to attach a numerical value to the respective categories: BK (background); BE (best effort); VI (video); VO (voice).

Figure 6:
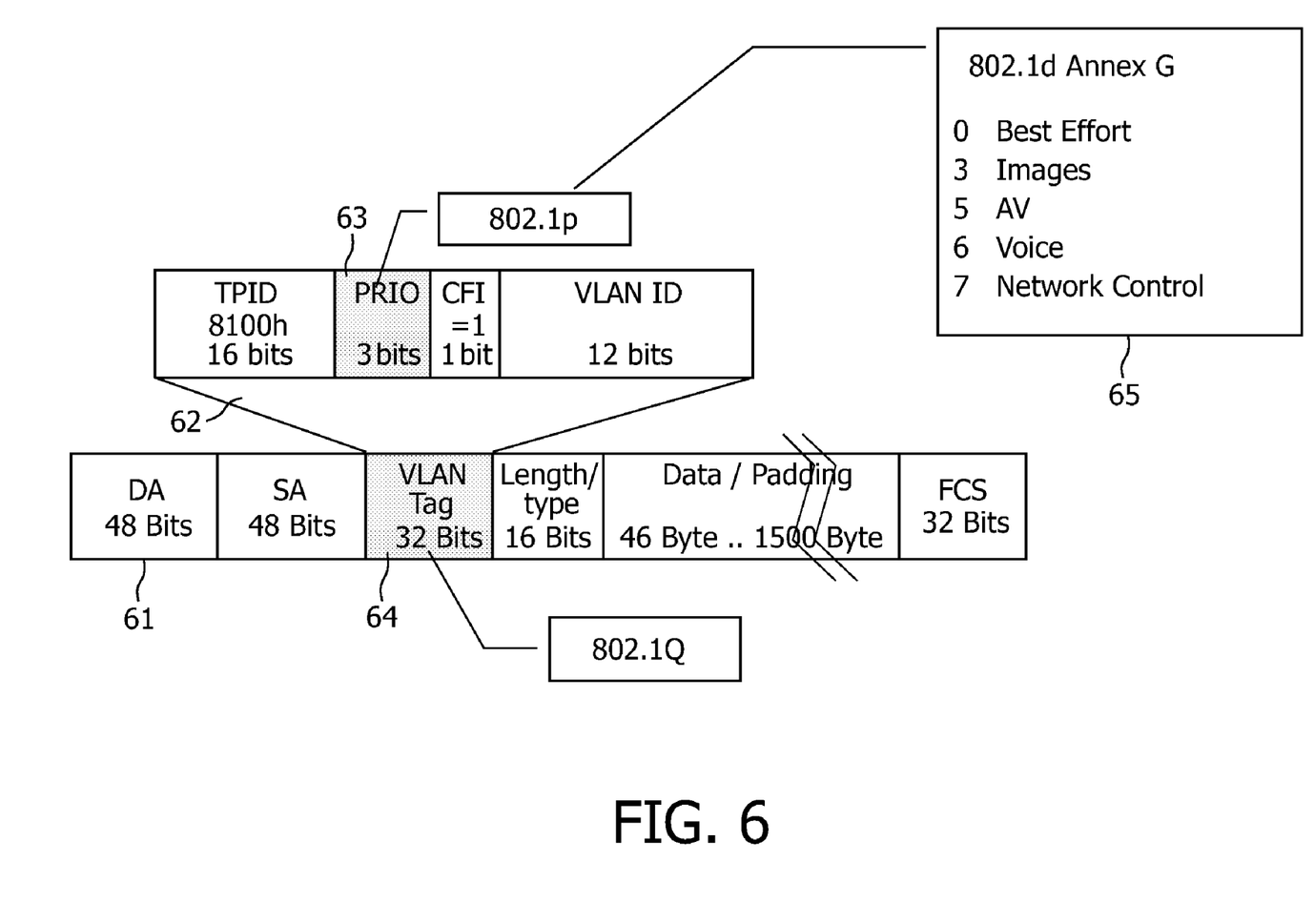
FIG. 6 shows adapting an Ethernet frame.

FIG. 6 shows adapting an Ethernet frame. The Fig. shows an Ethernet frame 61 having a VLAN tag 64 of 32 bits according to IEEE 802.1Q. The tag is shown in detail 62, and has a priority field 63 (PRIO) of 3 bits. According to IEEE 802.1p the priority field is assigned as value corresponding to the type of service as indicated in the table 65 based on IEEE 802.1d Annex G.

Figure 7:
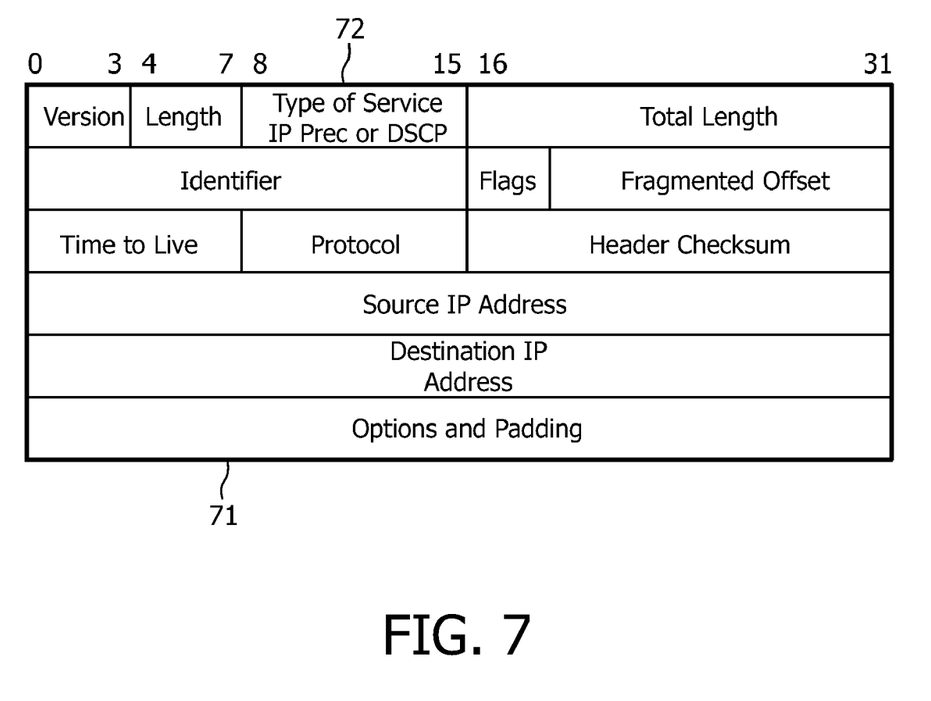
FIG. 7 shows an IP packet structure.

FIG. 7 shows an IP packet structure. The Fig. shows part of the structure 71 of an IP data packet on layer 3. The structure shows a header in rows of 32 bits, the header having a number of fields, such as the source IP address and the Destination IP address. In particular the header includes a type of service field 72 of 8 bits, which field indicates the IP Precedence or DSCP value. The value in the type of service field 72 is adapted by the network device as discussed above.

In practice the most used mechanism at layer-3 is DSCP, which uses 6-bits (64 values; lowest priority is 0, highest 63). The DSCP value is often interpreted in groups, 0-7 is treated the same, 8-15 etc (for details see http://www.techworld.com/features/index.cfm?fuseaction=displayfeature&featureid=394).

FIG. 8 shows a priority mapping. The Fig. shows a table 80 having a first column 81 shown a number of content types, ordered according to increasing priority: 0 (lowest) for software downloads, print jobs, etc; 1 (unknown); 2 (audio or video) and 3 (voice). Corresponding priority values are indicated in a second column 82 for DSCP IP-layer priority; in a third column 83 for Wired Ethernet priority (IEEE 802.1q); and in a fourth column 84 for Wireless priority (WMM access category). Note that in 802.1q the value '0' has special meaning (legacy or undefined) and is treated with higher priority than '1' (background, traffic explicitly identified as non-timing dependent). The priority mapping may for example be used in storage unit 305 coupled to priority unit 302 in FIG. 3. It is noted that there is no single standard about how particular layer-3 priority values correspond to particular layer-2 priority values. The Fig. shows a default mapping of 4 priorities, which can be configured differently by an (expert) user.

It is to be noted that the invention may be implemented in hardware and/or software, using programmable components. A method for implementing the invention has the following steps. First the method inspects incoming packets. When a packet is received: first, the source is of the packet is determined, e.g., based on IP address/port, or MAC address. If the source has been detected and matches a 'priority' rule, the priority as specified in the rule is used for this packet. Otherwise, if the source has a 'content-type' rule, identify the content type of the packet as specified by the rule. Otherwise (if no rule exists), determine the content type by analysing the protocol header, file format header, and content format headers, as follows. For HTTP, inspect the MIME-type header; for RTP, inspect AV profile used in the session setup (by RTSP, SIP, H323, etc.); for AVI files, inspect the FourCC code; for unknown files, try to match to popular compression format (MPEG, WMV, MP3, JPEG, . . . ). Subsequently map the identified content type to a QoS priority, for example, map 'video/mpeg' to the 'Video' QoS priority level. On the output process the packet as if is were received with the determine QoS priority. Mapping may be applied on both layer 2 and layer 3 packets (if the device has appropriate outgoing network interfaces).

Practical examples of priority and content rules are:

Priority Rule: a stream coming from www.philips.com will be always be classified as WMM priority 'VO' (meaning highest), Content Type Rule: a stream coming from mp3.com will always be classified as Audio, Automatic HTTP analysis: an incoming HTTP stream has MIME-type header 'video/mpeg'. The method will tag packets belonging to this HTTP stream with IP DSCP priority field. On its Wifi output, the packet will be queued according to WMM priority level 'VI' (video). On its Ethernet output, priority level '5' will be used in the 802.1p priority field of the 802.1q layer 2 tag, Automatic RTP analysis: for RTSP/H323/SIP sessions setup using RTP and SDP. the 'm' field in the SDP file identifies the content type for a particular TCP/UDP connection. For MPEG2 video, RTP AV profile content type 'MPV' is used. In this case, the method will tag packet as in the previous example.

Although the invention has been mainly explained by embodiments using the internet en home network segments, the invention is also suitable for any bridge between network segments for transferring data streams that are QoS unaware to other network segments that are QoS aware. Various network segments may physically share the same resources.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above.

The invention claimed is:

1. Network device comprising:
a first interface unit for coupling to a first network segment where service parameters are not controlled and no Quality of Service (QoS) information is available, wherein the first interface unit receives data packets via the first network segment, further wherein the received data packets comprise non-Quality of Service aware (non-QoS aware) data packets;
a second interface unit for coupling to a second network segment, wherein the second network segment is QoS aware and operates according to a type of service;
transfer means for transferring data packets between the first and second network segments; and
determining means for determining a service requirement for a received data packet that is to be transferred, via the transfer means, from the first network segment to the second network segment, as if the type of service was present for the received data packet, for accommodating the service requirement in the second network segment as determined for the received data packet;
wherein the determining means is arranged for detecting a source of the received data packet in the first network segment, and
for assigning, to the received data packet that comprises the non-QoS aware data packet, the type of service in dependence of the source of the received data packet, wherein said assigning the type of service is based on analyzing a control portion of the received data packet according to a predefined criteria, the predefined criteria including a mapping of a content type of the received data packet to the source of the received data packet; and wherein said assigning is made without use of any Quality of Service information previously provided for the received data packet.

2. Network device as claimed in claim 1, wherein the determining means is further arranged for detecting the source of the received data packet based on at least one of:
a network address indicator;
a network port indicator;
a media access indicator or Media Access Protocol (MAC) address;
and, in the event of the first network segment being coupled to the Internet;
an Internet Protocol (IP) address; or
a Uniform Resource Locator (URL).

3. Network device as claimed in claim 1, wherein the determining means further comprises a control interface for setting the predefined criteria, wherein the control interface comprises a user interface or an application programming interface (API).

4. Network device as claimed in claim 1, wherein the control portion comprises a Multipurpose Internet Mail Extensions (MIME)-type according to a hypertext transfer protocol (HTTP) protocol, an audio video (AV) profile according to a real time protocol (RTP), or a code indicating an encoder used for encoding the content of the data packet.

5. Network device as claimed in claim 1, wherein the transfer means are arranged for accommodating the type of service by adapting the control portion of the received data packet according to a predefined protocol.

6. Network device as claimed in claim 5, wherein said adapting the control portion of the received data packet according to a predefined protocol comprises adapting a header by setting a type of service field.

7. Network device as claimed in claim 1, wherein the second network interface comprises different buffer queues for packets of different types of service for interfacing to a wireless second network segment, and the transfer means for transferring the received packet via a selected one of the buffer queues based on the type of service.

8. Network device as claimed in claim 1, wherein the transfer means comprise a mass storage unit for storing data packets received from the first network segment and retrieving data packets to be transmitted to the second network segment, and the determining means are arranged for said assigning the type of service before said storing or after said retrieving.

9. Method of determining a service requirement while transferring data packets between a first network segment and a second network segment, wherein service parameters for the first network segment are not controlled and no Quality of Service (QoS) information is available, further wherein received data packets comprise non-Quality of Service aware (non-QoS aware) data packets, and wherein the second network segment is QoS aware and operates according to a type of service, the method comprising the steps of:

determining a service requirement for a received data packet of the received data packets, the received data packet to be transferred from the first network segment to the second network segment, as if the type of service was present for the received data packet, for accommodating the service requirement in the second network segment as determined for the received data packet;

which determining comprises:

detecting a source of the received data packet in the first network segment; and assigning, to the received data packet that comprises the non-QoS aware data packet, the type of service in dependence of the source of the received data packet, wherein said assigning the type of service is based on analyzing a control portion of the received data packet according to a predefined criteria, the predefined criteria including a mapping of a content type of the received data packet to the source of the received data packet; and wherein said assigning is made without use of any Quality of Service information previously provided for the received data packet;

and which transferring comprises:

accommodating the type of service in the second network segment for the received data packet.

10. Non-transitory computer readable storage medium comprising a computer program including a set of instructions executable by a processor to perform method steps for determining a service requirement while transferring data packets between a first network segment and a second network segment, wherein service parameters for the first network segment are not controlled and no Quality of Service (QoS) information is available, further wherein received data packets comprise non-Quality of Service aware (non-QoS aware) data packets, and wherein the second network segment is QoS aware and operates according to a type of service, the method steps comprising:

determining a service requirement for a received data packet of the received data packets that is to be transferred from the first network segment to the second network segment, as if the type of service was present for the received data packet, for accommodating the service requirement in the second network segment as determined for the received data packet; which determining comprises:

detecting a source of the received data packet in the first network segment; and assigning, to the received data packet that comprises the non-QoS aware data packet, the type of service in dependence of the source of the received data packet, wherein said assigning the type of service is based on analyzing a control portion of the received data packet according to a predefined criteria, the predefined criteria including a mapping of a content type of the received data packet to the source of the received data packet; and wherein said assigning is made without use of any Quality of Service information previously provided for the received data packet.

11. Network device as claimed in claim 1, wherein the control portion comprises an audio video (AV) profile according to a real time protocol (RTP).

12. Network device as claimed in claim 1, wherein the control portion of the received data packet comprises a code indicating an encoder used for encoding content of the data packet.

13. Network device as claimed in claim 1, wherein said assigning can be overwritten by explicitly defining a priority for all traffic coming from a specific source.

14. Method as claimed in claim 9, wherein said assigning can be overwritten by explicitly defining a priority for all traffic coming from a specific source.

15. The non-transitory computer readable storage medium as claimed in claim 10, wherein said assigning can be overwritten by explicitly defining a priority for all traffic coming from a specific source.

* * * * *